(12) United States Patent
Grosse-Boes et al.

(10) Patent No.: US 7,127,042 B2
(45) Date of Patent: Oct. 24, 2006

(54) DEVICE FOR PROVIDING DUAL MONITORING OF DIGITAL EQUIPMENT

(75) Inventors: Hans-Georg Grosse-Boes, Dorsten (DE); James D. Dewey, Plymouth, MN (US); Scott K. Baker, Richfield, MN (US); Dominic L. Louwagie, Eden Prairie, MN (US); Ryan L. Lindquist, Shakopen, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 297 days.

(21) Appl. No.: 10/174,534

(22) Filed: Jun. 17, 2002

(65) Prior Publication Data

US 2003/0231744 A1 Dec. 18, 2003

(51) Int. Cl.
*H04M 1/24* (2006.01)

(52) U.S. Cl. .............................. 379/32.01; 379/26.01; 379/27.07

(58) Field of Classification Search ............. 379/32.01, 379/1.03, 4, 15.01, 20, 22, 22.04, 22.06, 379/26.01, 27.01, 27.07, 28, 29.01, 29.11
See application file for complete search history.

(56) References Cited

U.S. PATENT DOCUMENTS

| | | | |
|---|---|---|---|
| 5,482,469 A * | 1/1996 | Seiceanu et al. | 439/188 |
| 5,546,282 A * | 8/1996 | Hill et al. | 361/796 |
| 5,685,741 A * | 11/1997 | Dewey et al. | 439/668 |
| 5,938,478 A | 8/1999 | Werner | |
| 6,038,766 A * | 3/2000 | Werner | 29/876 |
| 6,116,961 A | 9/2000 | Henneberger et al. | |

FOREIGN PATENT DOCUMENTS

WO    WO 96/38884    12/1996

OTHER PUBLICATIONS

Two sheets of drawings show ADC's 64-CKT DSI/FLEX Module all Front Access with I/O Monito, (Mar. 27, 2000).
Four sheets of drawings showing ADC's Assembly, Chassis Wire Wrap, FLEX-X (May 18, 2000).
Four sheets of drawings showing ADC's W/W Chassis Assembly Installation (Aug. 22, 2000).
Two sheets of drawings showing ADC's R145 Chassis Assembly Installation (Sep. 28, 2000).
Two sheets of drawings showing ADC's Monitor Panel, 64CKT Installation (Jul. 18, 2001).
"DSXI New Products, Monitor Panels," ADC, 2 pages, (date unknown).
"EI 64 Circuit Panel, Telect, Inc. Official Website, Telect Part Number: E64-5000-1100," http://www.telect.com/index.cfm?object=1499&op=1,992,701,1430,1495,1498,1499, 3 pages (Copyright 2001).
EI 64 Circuit Panek, Telect, Inc. Official Website, Telect Part Number: E64-5000-1200, http://www.telect.com/index.cfm?object=1500&op=1,922,701,1430,1495,1498,1500, 3 pages (Copyright 2001).

* cited by examiner

*Primary Examiner*—Barry Taylor
(74) *Attorney, Agent, or Firm*—Merchant & Gould P.C.

(57) ABSTRACT

A performance monitoring access device for a DSX system is disclosed herein. The monitoring device provides connection locations for readily connecting digital equipment to performance monitoring equipment. The monitoring devices allows for dual performance monitoring of digital equipment.

20 Claims, 7 Drawing Sheets

DEVICE FOR PROVIDING DUAL MONITORING OF DIGITAL EQUIPMENT

FIELD OF THE INVENTION

The present invention relates generally to telecommunications equipment. More particularly, the present invention relates to systems for monitoring digital equipment.

BACKGROUND OF THE INVENTION

A digital cross-connect system (DSX) provides a location for interconnecting two digital transmission paths. The apparatus for a DSX is located in one or more frames, or bays, usually in a telephone service provider's central office. The DSX apparatus also provides jack access to the transmission paths.

DSX jacks are well known and typically include a plurality of bores sized for receiving plugs. A plurality of switches are provided adjacent the bores for contacting the plugs. The jacks are electrically connected to digital transmission lines, and are also electrically connected to a plurality of termination members used to cross-connect the jacks. By inserting plugs within the bores of the jacks, signals transmitted through the jacks can be interrupted or monitored.

Figure 1:
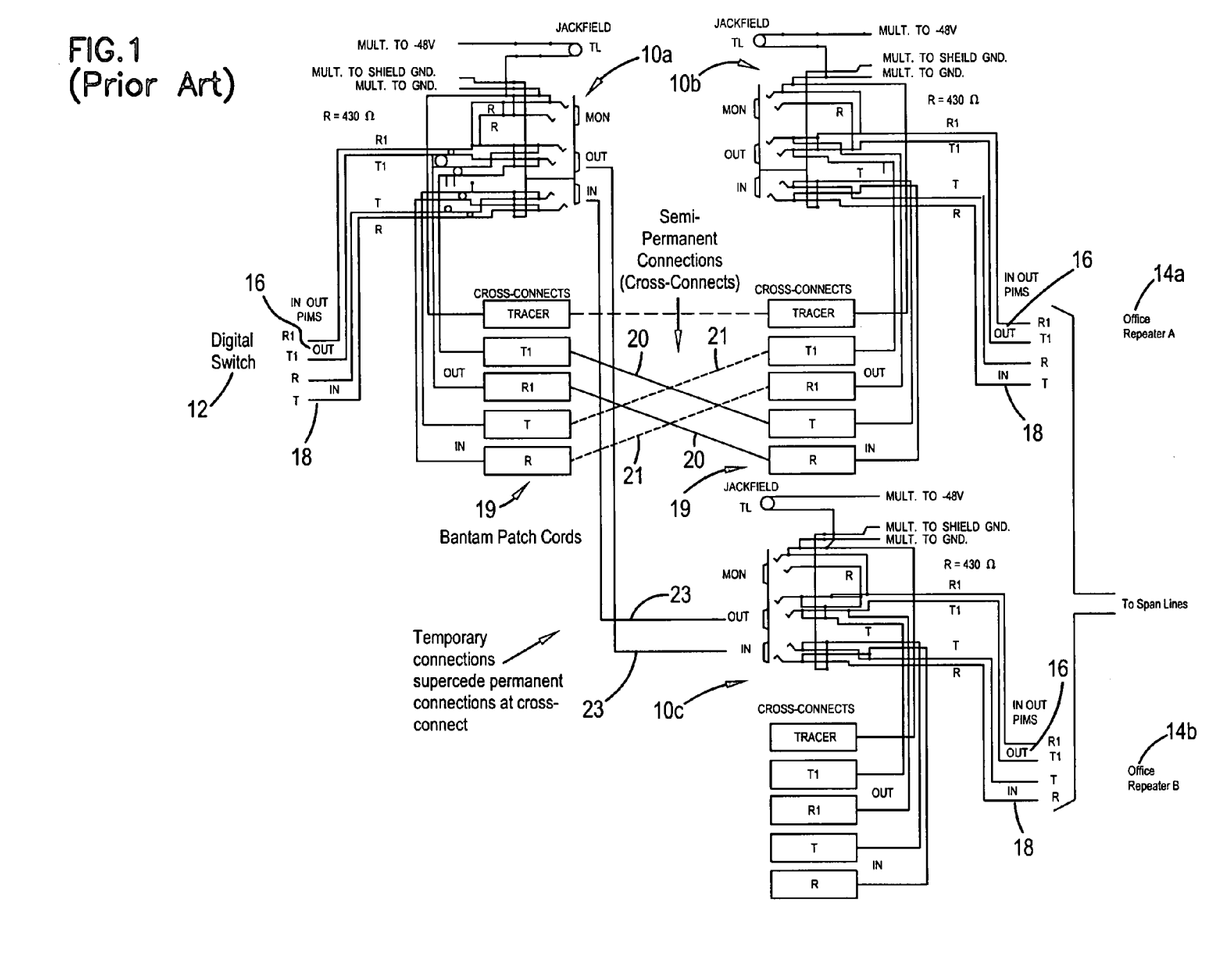
FIG. 1 is a schematic diagram of a prior art DSX system.

FIG. 1 schematically illustrates a DSX system that is an example of the type found at a telephone service provider's central office. The DSX system is shown including three DSX jacks 10a, 10b and 10c. Each DSX jack 10a, 10b and 10c is connected to a specific piece of digital equipment. For example, jack 10a is shown connected to digital switch 12, jack 10b is shown connected to office repeater 14a, and jack 10c is shown connected to office repeater 14b. Each piece of digital equipment has a point at which a digital signal can enter, as well as a point at which the digital signal can exit. The jacks 10a, 10b and 10c each include OUT termination pins 16 and IN termination pins 18. The DSX jacks 10a, 10b and 10c are connected to their corresponding pieces of digital equipment by connecting the OUT termination pins 16 to the signals exiting the equipment (i.e., going toward the DSX system) and the IN termination pins 18 to the signals entering the equipment (i.e., going away from the DSX system).

Referring still to FIG. 1, jacks 10a and 10b are "cross-connected" to one another by semi-permanent connections. A "semi-permanent" connection is a connection that is more permanent than the connections provided by typical patch cords equipped with tip-and-ring plugs. Example semi-permanent connectors include co-axial connectors, wire wrap connectors, RJ-45 type connectors and insulation displacement connectors. The semi-permanent connections extend between cross-connect fields 19 of the jacks 10a and 10b. For example, wires 20 connect OUT cross-connect pins of jack 10a to IN cross-connect pins of jack 10b. Similarly, wires 21 connect IN cross-connect pins of jack 10a to OUT cross-connect pins of jack 10b. The jacks 10a and 10b are preferably normally closed. Thus, in the absence of a plug inserted within either of the jacks 10a and 10b, an interconnection is provided through the jacks 10a and 10b and between digital switch 12 and office repeater 14a.

The semi-permanent connection between the digital switch 12 and the office repeater 14a can be interrupted for diagnostic purposes by inserting patch cord plugs within the IN or OUT ports of the jacks 10a and 10b. Likewise, patch cords can be used to interrupt the semi-permanent connection between the jacks 10a and 10b to provide connections with other pieces of digital equipment. For example, the digital switch 12 can be disconnected from the office repeater 14a and connected to the office repeater 14b through the use of patch cords 23. The patch cords 23 include plugs that are inserted within the IN and OUT ports of the jack 10a and the IN and OUT ports of the jack 10c. By inserting the plugs within the IN and OUT ports of the jack 10a, the normally closed contacts are opened, thereby breaking the electrical connection with the office repeater 14a and initiating an electrical connection with office repeater 14b.

SUMMARY OF THE INVENTION

The present invention relates to devices for facilitating monitoring telecommunications signals.

A variety of aspects of the invention are set forth in part in the description that follows, and in part will be apparent from the description, or may be learned by practicing the invention. The aspects of the invention relate to individual features as well as combinations of features. It is to be understood that both the foregoing general description and the following detailed description are exemplary and explanatory only, and are not restrictive of the invention as claimed.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

a. General Description of Example Embodiment

FIGS. 2–5 illustrate a monitor unit 30 that is an embodiment of the present invention. The monitor unit 30 includes a chassis 32 having a front side 31 (shown in FIG. 3) and a back side 33 (shown in FIG. 4). The monitor unit 30 also includes multiple rows of monitor jacks 34 that are accessible from the front side 31 of the chassis 32. First and second groups 35, 37 of front connectors 38 (e.g., wire termination posts) are positioned on opposite sides of the monitor jacks 34. The front connectors 38 allow the monitor unit 30 to be electrically coupled to other DSX jacks (such as jacks 501, 503 shown in FIG. 7) by semi-permanent connections. The monitor unit 30 also includes a plurality of rear connectors 40 (e.g., co-axial connectors) that are accessible from the back side 33 of the chassis 32. The rear connectors 40 allow the monitor unit 30 to be electrically coupled to equipment 43 (see FIG. 7) such as testing or performance monitoring equipment.

In use of the monitoring unit 30, signals from a DSX circuit desired to be monitored (e.g., the circuit defined by jacks 501, 503 of FIG. 7) are input to the monitoring unit 30 through the front connectors 38. From the front connectors 38, the signals are carried through the chassis 32 to the rear connectors 40. From the rear connectors 40, the signals are carried to test/monitoring equipment such as the equipment 43 of FIG. 7. To perform dual monitoring of a signal, a tip-and-ring plug can be inserted into a corresponding one of the monitor jacks 34. By inserting the plug in the jack 34, a portion of the signal can be temporarily patched (e.g., by a patch cord) to additional test/monitoring equipment such as test equipment 45 shown in FIG. 7. Dual monitoring is particularly useful for performing different types of tests on a signal, or for test verification.

In one particular application, the monitoring unit 30 is used in combination with DSX circuitry that lacks integral semi-permanent performance monitoring circuitry. By electrically coupling the cross-connect contacts of a DSX circuit desired to be monitored to the front connectors 38 of the unit 30, semi-permanent monitoring can be provided (e.g., by equipment 43 shown in FIG. 7). Through monitor jacks 34, dual monitoring can also be provided (e.g., by test equipment 45 shown in FIG. 7). The dual performance monitoring capability of the unit makes the unit useful for all types of DSX systems.

b. Detailed Description of Example Embodiment

Figure 2:
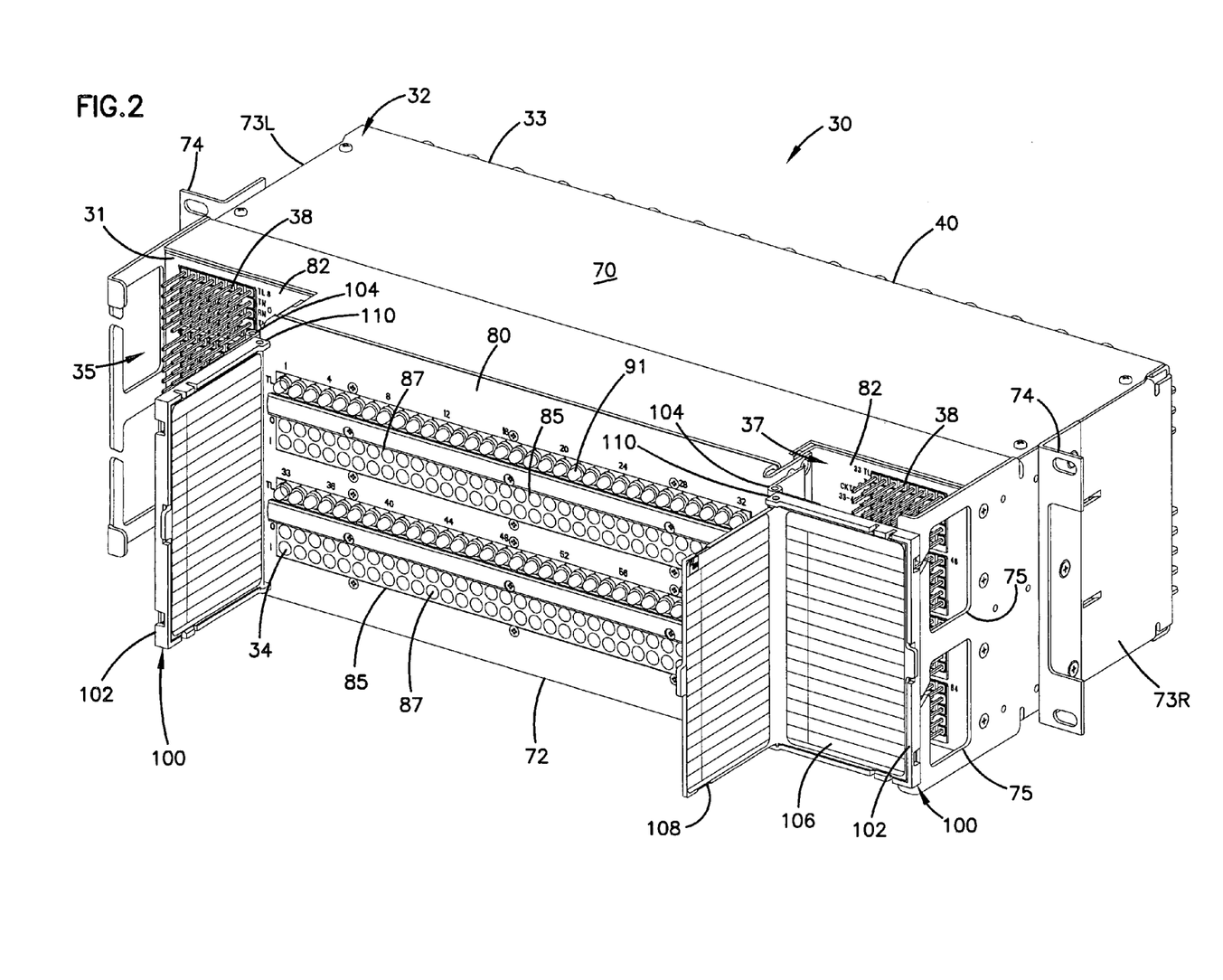
FIG. 2 is a front perspective view of a monitor unit that is an embodiment of the present invention.

Referring to FIG. 2, the chassis 32 of the monitor unit 30 is shown. The chassis 32 includes top and bottom walls 70, 72 interconnected by left and right sidewalls 73L, 73R. Top and bottom walls 70, 72 and side walls 73L, 73R cooperate to define a chamber or housing for containing the jacks 34. Mounting flanges 74 are mounted on the left and right side walls 73L, 73R. The mounting flanges 74 are used to connect the chassis 32 to a conventional telecommunications rack. Adjacent the front side 31 of the chassis 32, the side walls 73L, 73R define access openings 75 for allowing cables to be routed through the side walls to the front connectors 38. The openings 75 promote cable management by separating groups of cables.

To conform to conventional international standards, the chassis 32 can have a length of about 19 inches. Alternatively, in accordance with standard United States specifications, the chassis could be configured to have a length of about 23 inches. Of course, other sizes of chassis could also be used.

Figure 3:
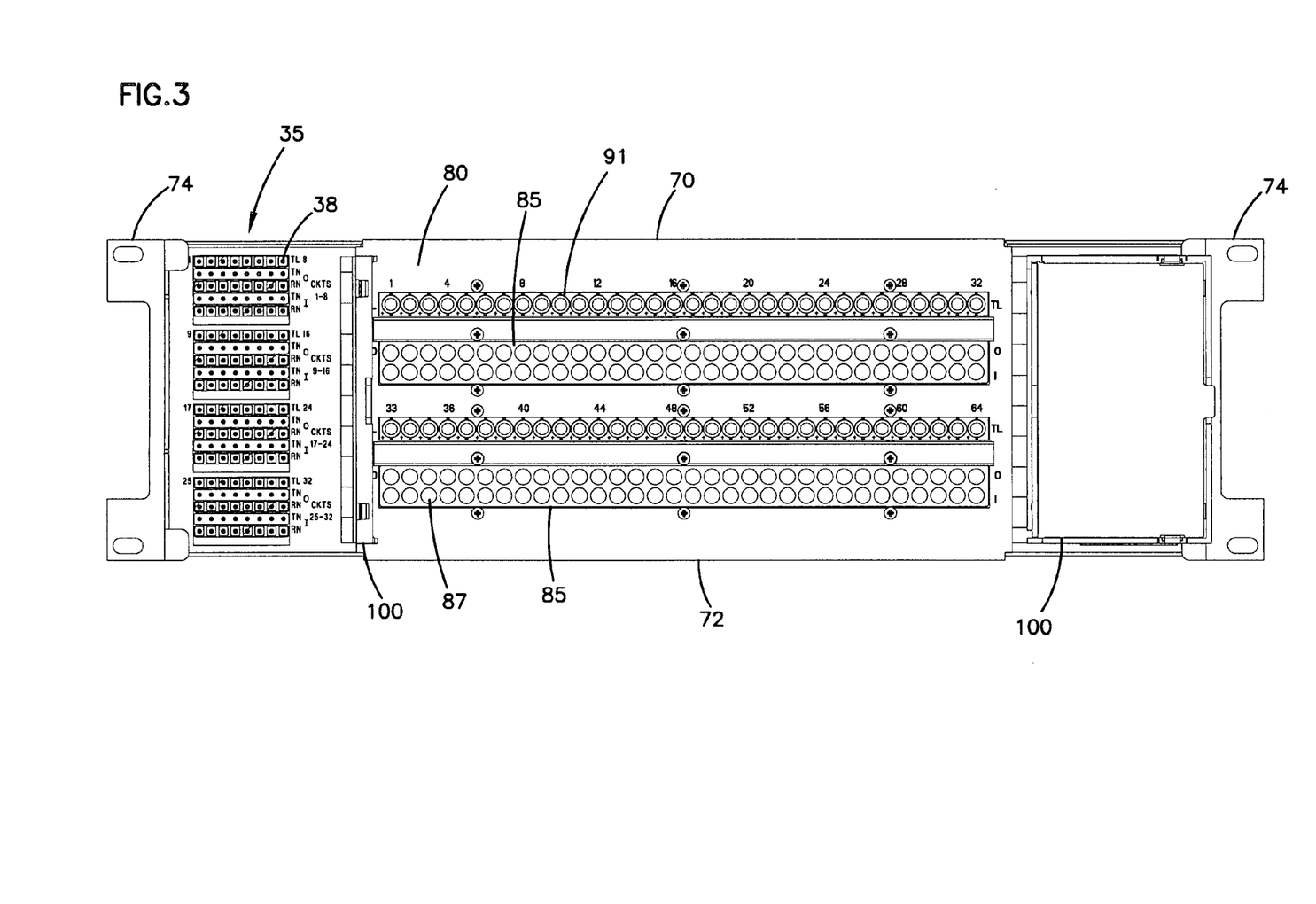
FIG. 3 is a front view of the monitor unit of FIG. 2.

Referring to FIGS. 2 and 3, the front side 31 of the chassis 32 includes a central front plate 80 and two recessed front plates 82 positioned on opposite sides of the central plate 80. The recessed plates 82 are set back relative to the central plate 80. The monitor jacks 34 are mounted at the central plate 80, and the groups 35, 37 of front connectors 38 are mounted at the recessed plates 82.

Referring to FIG. 2, the chassis 32 includes two dielectric panels 85 that are fastened to the central plate 80. The panels 85 each define a plurality of vertical rows of openings 87 (e.g., 32 rows as shown in FIG. 3). The jacks 34 are secured to the back sides of the panels 85. In one non-limiting embodiment, the monitor jacks 34 have a die-cast construction and include plug-receiving sleeves 89 (see FIG. 6) that align with corresponding tip springs 93a, 93b and ring springs 95a, 95b (see FIG. 6). To mount the jacks 34 to the panels 85, the sleeves 89 of the jacks 34 are inserted within the openings 87 of the panels 85. The jacks 34 are held securely in place by fasteners that engage the backsides of the panels 85. The openings 87 in the panels 85 align the jacks in a plurality of vertical rows. A tracer lamp 91 is provided for each vertical row of jacks 34. In a preferred embodiment, each vertical row of jacks 34 includes exclusively monitor jacks. In this embodiment, it will be appreciated that a monitor jack is a jack that does not include switching capabilities such as those present in a normal-through jack. Other embodiments are also contemplated in which other types of jacks (e.g., normal-through jacks) are included. Further, in other embodiments, the jacks could have a readily removable (e.g., snap fit) configuration such as those disclosed in U.S. Pat. No. 6,116,961, which is hereby incorporated by reference.

The groups 35, 37 of front connectors 38 are mounted at the recessed front plates 82 of the chassis 32 and are accessible from the front side of the chassis 32. As shown in FIGS. 2 and 3, each group 35, 37 is arranged in an array having vertical and horizontal rows of front connectors 38. While the front connectors 38 have been shown as wire termination posts, it will be appreciated that a number of different types of connectors could be used. Representative types of connectors include insulation displacement connectors; co-axial connectors such as BNC connectors, 1.6/5.6 connectors or SMB connectors; or RJ series connectors such as RJ45 connectors, RJ48 connectors or RJ21 connectors. Further, while the front connectors 38 have been shown on opposite sides of the jacks, other configurations could be used. For example, the front connectors 38 could be located above or below the jacks 34, or could be located only on one side of the jacks 34.

The groups 35, 37 of front connectors 38 are protected by front doors 100. The front doors 100 include frames 102 pivotally connected to the chassis 32 at hinges 104. The hinges 104 allow the doors 100 to be opened to provide enhanced access to the connectors 38. In FIGS. 2 and 3, the left door is shown in an open position.

The front doors 100 also include rear panels 106 fixedly connected to the frames 102, and front panels 108 pivotally connected to the frames 102 at hinges 110. The hinges 110 allow the front panels 108 to pivot outwardly to expose the front sides of the rear panels 106 (see the right door of FIG. 2). When closed, the front panels 108 snap or nest within the frames 102 (see the left door of FIG. 2). In use, designation information for the front connectors 38 can be recorded on labels placed on the front and back sides of the front panels 108. Similarly, designation information for the rear connectors 40 can be recorded on labels placed on the rear panels 106.

Figure 4:
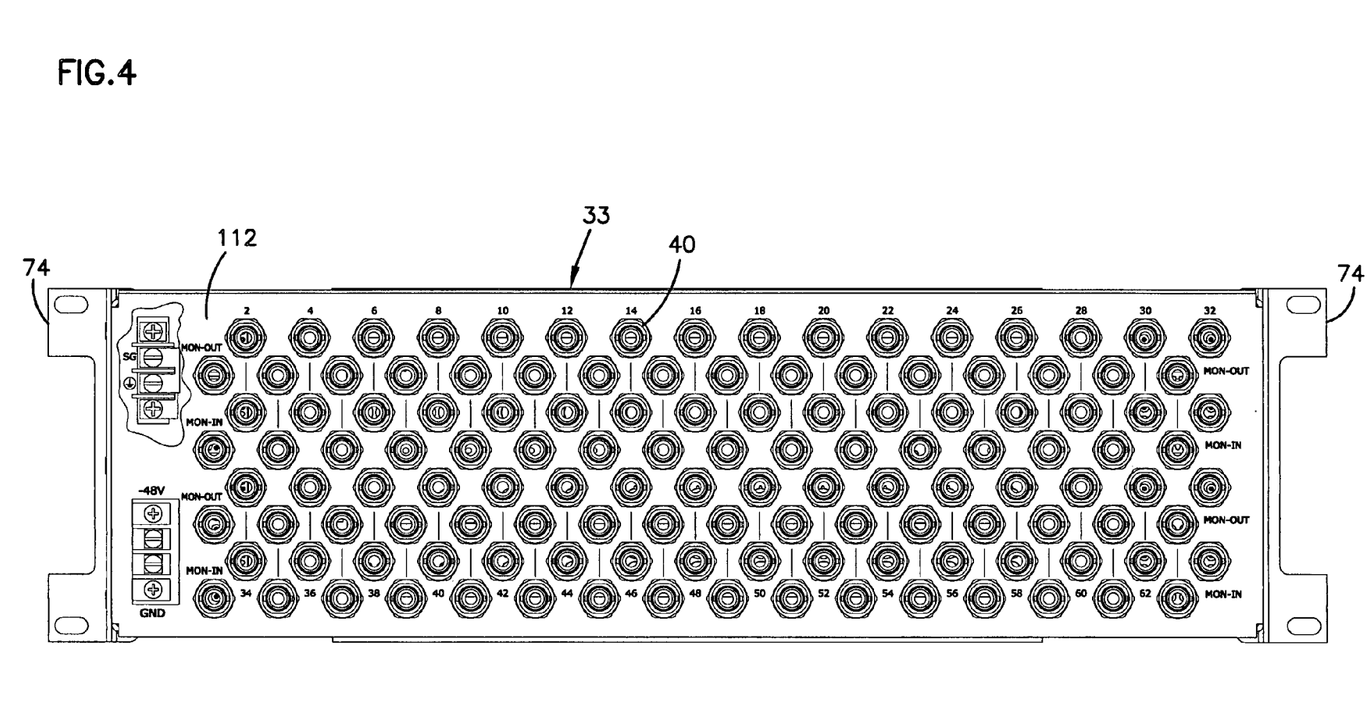
FIG. 4 is a rear view of the monitor unit of FIG. 2.
Figure 5:
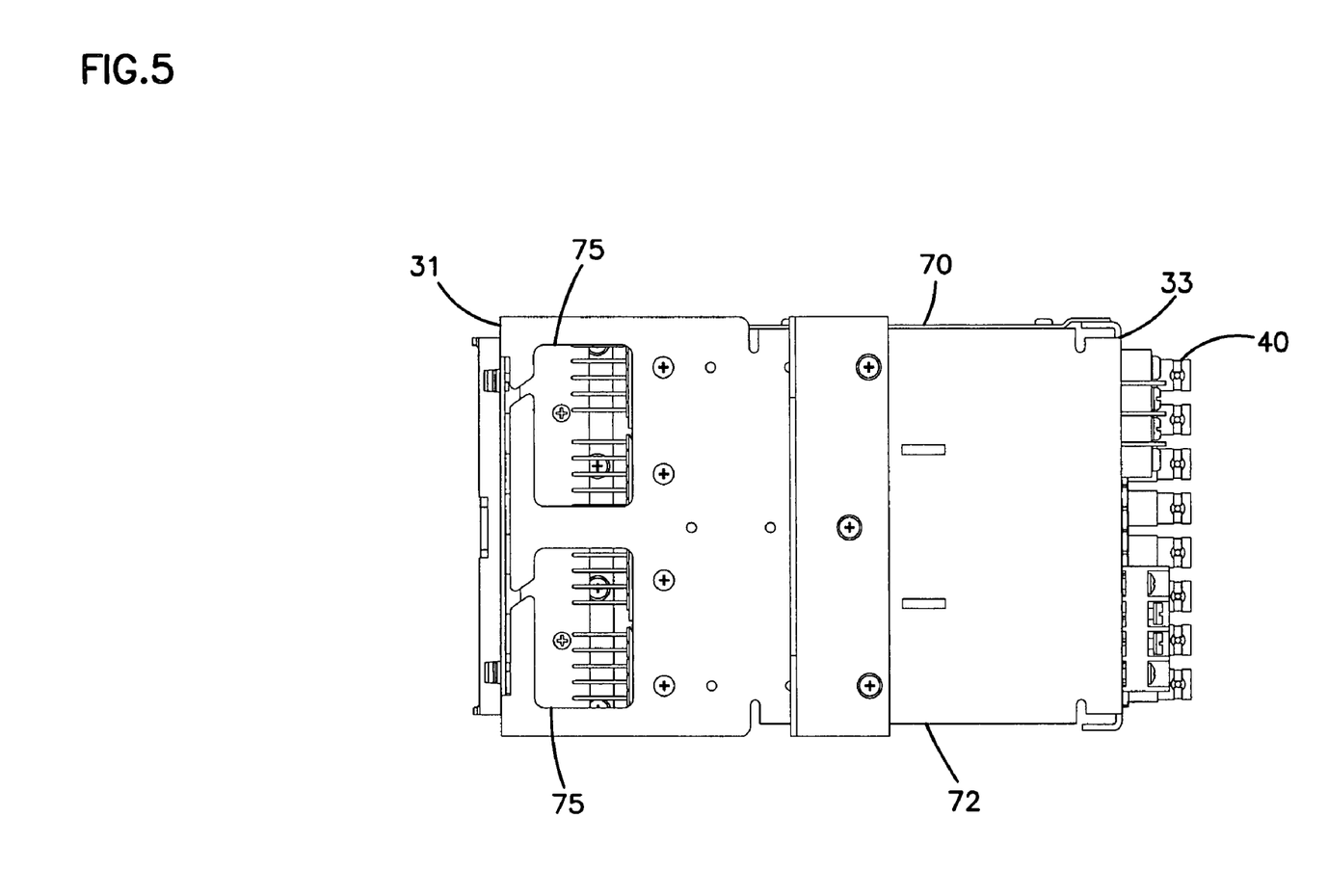
FIG. 5 is a side view of the monitor unit of FIG. 2.

Referring to FIGS. 4 and 5, the back side 33 of the chassis 32 includes a back plate 112. The rear connectors 40 project rearwardly from the back plate 112. While the connectors 40 have been shown as 75 ohm, co-axial BNC connectors, it will be appreciated that other types of connectors could also be used. Representative types of connectors include insulation displacement connectors; wire termination posts; other types of co-axial connectors such as 1.6/5.6 connectors or SMB connectors; or RJ series connectors such as RJ45 connectors, RJ48 connectors or RJ21 connectors.

c. Circuit Schematic for Example Embodiment

Figure 6:
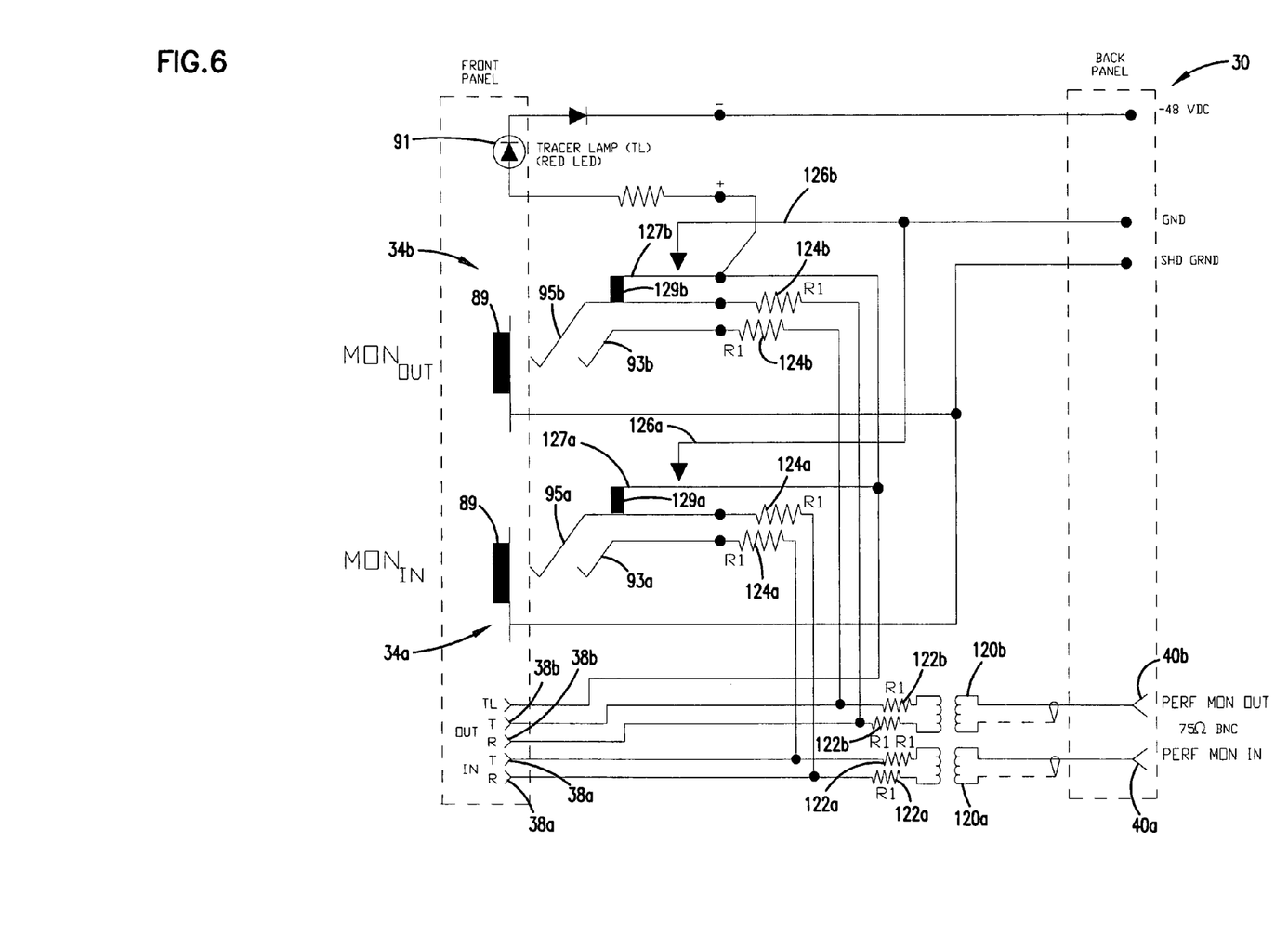
FIG. 6 is a circuit schematic for the monitor unit of FIG. 2.

FIG. 6 shows a circuit path schematic for the monitor unit 30 of FIGS. 2–5. The circuit paths include front connectors 38a, 38b electrically connected (e.g., by wires or tracings in a circuit board) to rear connectors 40a, 40b. Inductors 120a, 120b (i.e., baluns) are positioned between the front connectors 38a, 38b and the rear connectors 40a, 40b for converting signals from twisted pair (i.e., balanced signals) to co-axial signals (i.e., unbalanced). Resistors 122a, 122b are also provided between the front connectors 38a, 38b and the rear connectors 40a, 40b. The resistors 122a, 122b provide signal resistance such that monitor level signals are output at the rear connectors 40a, 40b.

The circuit paths also include monitor jacks 34a, 34b having tip and ring springs 93a, 95a that are electrically coupled to the front connectors 38a, 38b (e.g., by wires or tracings on a circuit board). Resistors 124a, 124b are provided between the front connectors 38a, 38b and the monitor jacks 34a, 34b. The resistors 124a, 124b provide signal resistance such that monitor level signals are output through the monitor jacks 34a, 34b.

In a preferred embodiment, the resistors 122a, 122b, 124a and 124b are adapted to provide an industry standard monitor level signal (e.g., approximately 20 dB for most applications). Of course, the decibel level of the monitor signal can vary depending upon the industry standard that is applicable. In one non-limiting embodiment, the resistors 122a, 122b, 124a and 124b each provide a resistance of about 523 ohms.

Referring still to FIG. 6, each of the monitor jacks 34a, 34b includes a corresponding tracer lamp ground spring 126a, 126b. The ground springs 126a, 126b normally do not engage corresponding contact springs 127a, 127b. Contact springs 127a, 127b are mechanically coupled to monitor springs 95a, 95b by dielectric spacers 129a, 129b. When a plug is inserted into either of the jacks 34a, 34b, the springs 127a, 127b are flexed upwardly into contact with their corresponding tracer lamp ground springs 126a, 126b causing the corresponding tracer lamp 91 to be illuminated. Simultaneously, tracer lamps corresponding to DSX jacks electrically coupled to the monitor jacks 34a, 34b are also illuminated as described below. It will be appreciated that details regarding the operation of tracer lamp circuitry are well known in the art. A more detailed description of tracer lamp circuitry is provided in U.S. Pat. No. 6,116,961, which was previously incorporated by reference.

Figure 7:
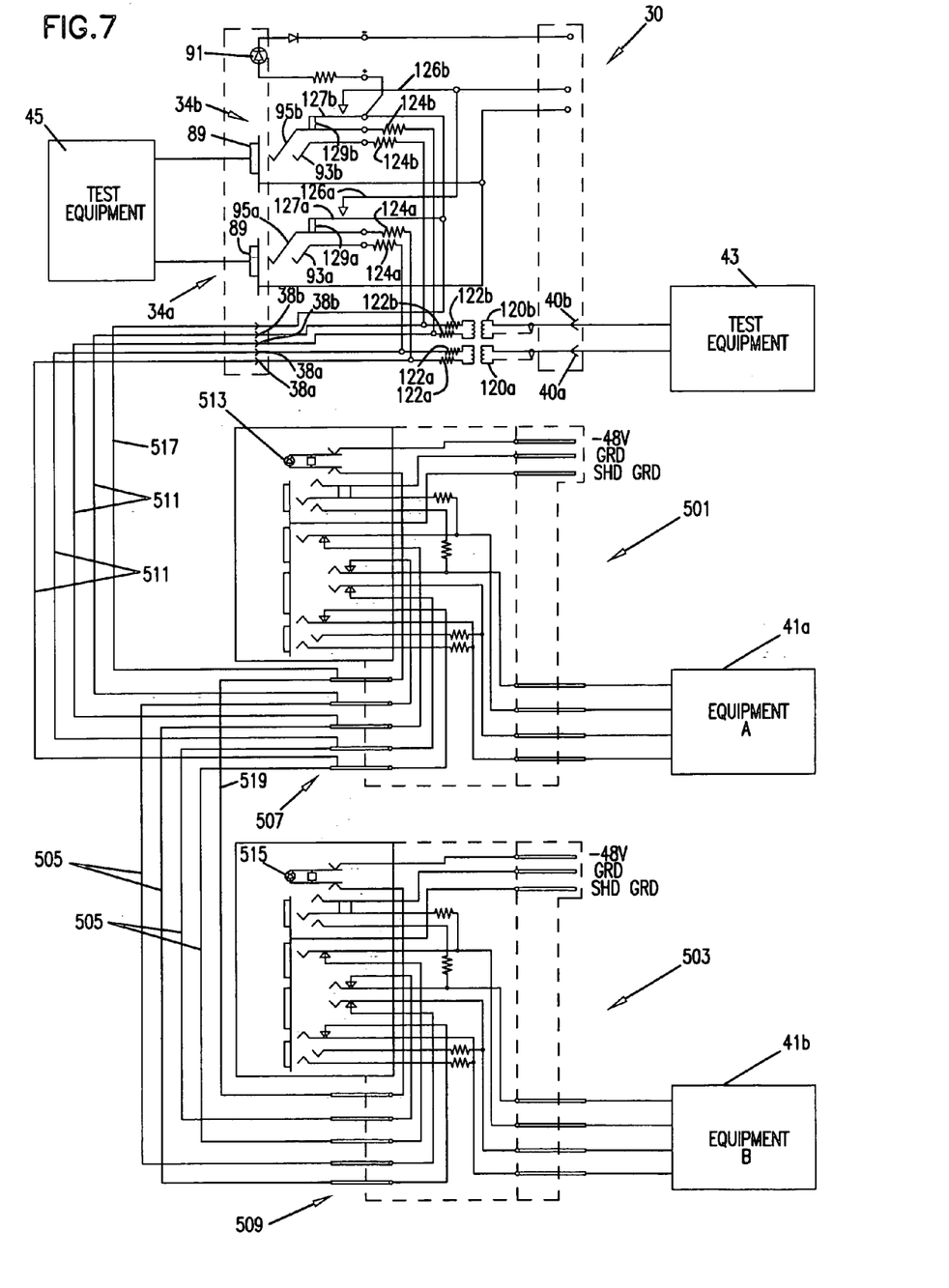
FIG. 7 is a circuit schematic illustrating an example use for the monitor unit of FIG. 2.

FIG. 7 shows an example use for the monitoring unit 30. In FIG. 7, the monitoring unit 30 is being used to provide signal monitoring of signals transferred between two cross-connected DSX jacks 501, 503. The jacks 501, 503 are respectively coupled to pieces of telecommunications equipment 41a, 41b (e.g., digital switches, office repeaters, etc.). Wires 505 cross-connect the jacks 501, 503. The wires 505 are terminated at cross-connect contacts 507, 509 (e.g., wire wrap pins) of the jacks 501, 503. The monitoring unit 30 is electrically coupled to the DSX jacks 501, 503 by wires 511 terminated at the front connectors 38a, 38b and at the cross-connect contacts 507. Portions of signals transferred between the equipment 41a, 41b through the jacks 501, 503 are carried to the monitoring unit 30 by wires 511. The signals enter the monitoring unit 30 through the front connectors 38a, 38b. From the front connectors 38a, 38b, the signals are carried through resistors 122a, 122b to the inductors 120a, 120b. At the inductors 120a, 120b, the signals are converted from twisted pair to co-axial. The co-axial signals are output through the rear connectors 40a, 40b. From the rear connectors 40a, 40b, the signals are carried to the test/monitoring equipment 43. To perform dual monitoring of the signals, tip-and-ring plugs can be inserted into the monitor jacks 34a, 34b. By inserting the plugs in the jacks 34a, 34b, portions of the signals can be temporarily patched (e.g., by a patch cord) to additional test/monitoring equipment 45.

When a plug is inserted into either of the jacks 34a, 34b, the corresponding tracer lamp ground spring 126a, 126b is placed in electrical connection with the tracer lamp circuit of the monitor unit 30 as well as the tracer lamp circuits of the jacks 501, 503. For example, when plugs are inserted within the jacks 34a, 34b, the springs 127a and 127b are deflected upwardly into contact with ground springs 126a and 126b, respectively. This causes the tracer lamp circuit of the monitoring unit 30 to be grounded and the tracer lamp 91 to be illuminated. Simultaneously, the tracer lamp circuits corresponding to both DSX jacks 501, 503 are also grounded causing their tracer lamps 513, 515 to also be illuminated. Tracer lamp wires 517 and 519 provide electrical connections between the tracer lamp circuits of the monitoring unit 30 and the two jacks 501, 503 such that all three circuits are simultaneously grounded when a plug is inserted into one of the monitor ports of the monitor unit 30.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A monitoring unit for a digital cross-connect system, the monitoring unit comprising:
   a chassis adapted for connection to a rack;
   a plurality of tip-and-ring spring jacks mounted within the chassis, all of the tip-and-ring spring jacks mounted within the chassis being monitor jacks;
   a plurality of first connectors electrically connected to the tip-and-ring spring jacks, the first connectors providing electrical connection locations for allowing telecommunications equipment to be electrically coupled to the tip-and-ring spring jacks;
   a plurality of second connectors electrically connected to the first connectors, the second connectors providing electrical connection locations for allowing test equipment to be electrically coupled to the first connectors; and
   resistors for providing electrical resistance to signals input to the monitoring unit through the first connectors, the resistors being positioned such that signals output from the monitoring unit through the tip-and-ring spring jacks are monitor level signals and signals output from the monitoring unit through the second connectors are monitor level signals, wherein the tip-and-ring spring jacks and the second connectors provide access locations for allowing dual monitoring of the signals input through the first connectors.

2. The monitoring unit of claim 1, wherein the second connectors include co-axial connectors.

3. The monitoring unit of claim 2, wherein the first connectors include wire termination posts.

4. The monitoring unit of claim 1, wherein the chassis includes a front side and a back side, wherein the tip-and-ring spring jacks and the first connectors are accessible from the front side of the chassis, and wherein the second connectors are accessible from the back side of the chassis.

5. The monitoring unit of claim 4, wherein the first connectors include wire termination posts, and wherein the second connectors include co-axial connectors.

6. The monitoring unit of claim 5, wherein the tip-and-ring spring jacks are located at a central region of the front side of the chassis, wherein the wire termination posts include first and second groupings of wire termination posts located at the front side of the chassis, and wherein the central region is located between the first and second groupings of wire termination posts.

7. The monitoring unit of claim 6, wherein the tip-and-ring spring jacks are fastened to panels located at the front side of the chassis.

8. The monitoring unit of claim 6, wherein the chassis includes first and second doors for respectively covering the first and second groupings of wire termination posts, each of the first and second doors including first and second label panels that are pivotally movable relative to one another.

9. The monitoring unit of claim 8, wherein the first and second doors are connected to the chassis by hinges.

10. A monitoring unit for a digital cross-connect system, the monitoring unit comprising:
   a chassis adapted for connection to a rack, the chassis including a front side and a back side;
   at least one vertical row of tip-and-ring spring jacks mounted within the chassis, all of the tip-and-ring spring jacks mounted within the chassis being monitor jacks, tip-and-ring spring jacks being accessible from the front side of the chassis;
   a plurality of wire termination members electrically connected to the tip and ring spring jacks, the wire termination members being accessible from the front side of the chassis;
   first resistors positioned between the wire termination members and the tip and ring spring jacks;
   a plurality of co-axial connectors electrically connected to the wire termination members, the co-axial connectors being accessible from the back side of the chassis; and
   second resistors positioned between the wire termination members and the co-axial connectors.

11. The monitoring unit of claim 10, further comprising a plurality of vertical rows of tip-and-ring spring jacks.

12. The monitoring unit of claim 11, wherein the tip-and-ring spring jacks are secured to a front panel.

13. The monitoring unit of claim 10, wherein the chassis includes a door for covering the wire termination members.

14. The monitoring unit of claim 13, wherein the door includes first and second panels, the first panel being connected to the chassis at a first pivot axis, and the second panel being connected to the first panel at a second pivot axis that is adjacent to the first pivot axis.

15. The monitoring unit of claim 10, wherein the wire termination members are grouped on opposite side of the rows of jacks.

16. A telecommunications device comprising:
   a monitoring device having a front and a back;
   a plurality of front connectors accessible from the front of the monitoring device;
   a plurality of rear connectors accessible from the back of the monitoring device;
   the front and rear connectors being electrically connected by circuitry that lack switches for breaking the electrical connections between the front and rear connectors;
   tip and ring springs electrically connected to the front connectors, the tip and ring springs providing access locations for monitoring signals carried from the front connectors to the rear connectors; and
   resistors for providing electrical resistance between the front and rear connectors and for providing electrical resistance between the front connectors and the tip and ring springs.

17. The telecommunications device of claim 16, wherein the tip and ring springs are accessible from the front of the monitoring device.

18. The telecommunications device of claim 16, wherein the rear connectors include co-axial connectors.

19. The telecommunications device of claim 16, wherein the front connectors include wire termination posts.

20. The telecommunications device of claim 16, wherein digital equipment desired to be monitored is electrically connected to the front connectors, wherein test equipment is connected to the rear connectors, and wherein the tip and ring springs allow for dual monitoring of signals carried from the digital equipment to the test equipment.

* * * * *